Aug. 11, 1936.      L. D. CULL      2,050,278

ANTISKID CHAIN

Filed Jan. 27, 1936

INVENTOR.

LOUIS D. CULL

BY Saywell & Wesseler,

ATTORNEYS.

Patented Aug. 11, 1936

2,050,278

UNITED STATES PATENT OFFICE 2,050,278

ANTISKID CHAIN

Louis D. Cull, Shaker Heights, Ohio, assignor to The Cleveland Chain & Manufacturing Company, Cleveland, Ohio, a corporation of Ohio Application January 27, 1936, Serial No. 60,995

6 Claims. (Cl. 152—14)

This invention, as indicated, relates to an anti-skid chain. More particularly, it comprises a cross-chain for automobile tires, having a special type of link at the tread portion thereof reinforced in a manner to give better traction, to prevent undue wear on the link ends, and particularly to counteract any tendency of the vehicle equipped with this device to slip sidewise on icy surfaces and the like.

Heretofore various expedients have been used to reinforce links centrally of the cross-chains of an anti-skid device, such reinforcement in many instances being directed toward securing interlocking engagement with the road surface in a longitudinal direction. It is, of course, desirable to secure forward tractive effect, but with many chains, side-slipping is not prevented even though improved operation in the direction of travel is attained as well as reduced wear on the link ends. Side-slipping, however, often takes place even with a very slowly moving vehicle, and some chains which increase traction at the same time promote the tendency to slip sidewise. The present invention, while providing improved traction in the direction of travel, has the additional important function of providing effective interlocking surfaces to counteract transverse displacement of the cross-chains and adjacent vehicle structure when the vehicle is in motion.

Where chains are provided with reinforced links, a number of difficulties arise. If the reinforcing members are placed in a position adding their entire thickness of metal above the tire surface, they introduce, where a hard surface is traveled over, an excessive degree of vibration in the wheel, some of which is transmitted to the vehicle, and at the same time provide small supporting areas which wear down rapidly.

When longitudinally-extending cross-lugs with sharp end surfaces are used for reinforcing they at times are rotated to an extent sufficient to gouge grooves in the tire tread, and where such lugs are of reduced size they often wear to knife edges and likewise destroy the tire surface when rotation takes place under severe driving conditions or through loose adjustment. Where bars are placed across the links or within the links they reduce the effective size of the opening of the link to such an extent that they prevent the natural link movement between adjacent links from dislodging foreign matter from the link centers, and accumulate compacted snow, ice, clay or the like, which will enhance the tendency to skid.

Longitudinally-extending cross-lugs also tend to provide miniature runners, particularly when there is wear on the outer ends and thus skids may be induced rather than prevented by such devices. They likewise offer substantially no resistance to side skid, particularly on a crowned road or on a deeply rutted surface.

The objections above indicated are avoided in the present invention by keeping the central areas of the links fully open and thus self-clearing, by increasing the number of supporting areas in contact with the road surface to distribute friction and reduce wear, and by providing reinforcing members with broad self-clearing grooves in place of small surfaces for traction engagement to prevent tire-tread gouging, and by providing small plate-like surfaces facing transversely and thus subject to relatively slight wear, to resist transverse or side skid.

The principal object of the present invention is to provide an improved type of reinforcement and skid-preventing means for tire chains.

Another object of the invention is to provide a cross-chain having specialized links over the tread portion of the structure which will be free of clogging with ice, snow, clay, and other foreign matter, and will be maintained in active skid-preventing condition under severe usage.

Another object of the invention is to provide an improved type of reinforced link for cross-chains which will be simple of manufacture and which will provide a plurality of specially shaped surfaces to secure traction and interlocking engagement with the road surface and resist displacement laterally as well as in the direction of travel.

A further object of the invention is to provide a reinforced non-skid link for cross-chains which will maintain its effective interlocking engagement with the road surface throughout a long period of use and will provide auxiliary supporting means on the side portions of the link opposite the surface of the link in engagement with the tire.

A further object of the invention is to provide a reinforced non-skid link for cross-chains which may be manufactured on automatic machines on a quantity production basis with the maximum of dependability and at relatively low cost.

Another object of the invention is to provide a non-skid link for cross-chains with a reinforcing bar extending transversely of the tire and angularly with reference to the tire surface so as to provide supporting and interengaging surfaces to bear against the road surface to prevent lateral displacement of the vehicle wheel as well as to afford traction in the direction of travel.

A further object of the invention is to provide a pair of reinforcing bars upon a non-skid link of a cross-chain extending parallel to each other as viewed from above and extending at reverse angles to each other as viewed longitudinally or in the direction of travel of the vehicle at a point adjacent the surface of the tire and providing projecting angular surfaces at approximately the plane of the outermost portion of the cross-chain.

Other and further objects of the invention will appear in the course of the following description.

To the accomplishment of the foregoing and related ends, said invention, then, consists of the means hereinafter fully described and particularly pointed out in the claims, the annexed drawing and the following description setting forth in detail certain structures embodying the invention, such disclosed means constituting, however, but several of various forms in which the principle of the invention may be used.

As has been indicated, the invention relates to an anti-skid chain, and the anti-skid elements are formed on the cross-chains, which cross-chains may be of conventional type except for the links immediately over the tread portion of the tire.

Figure 1:
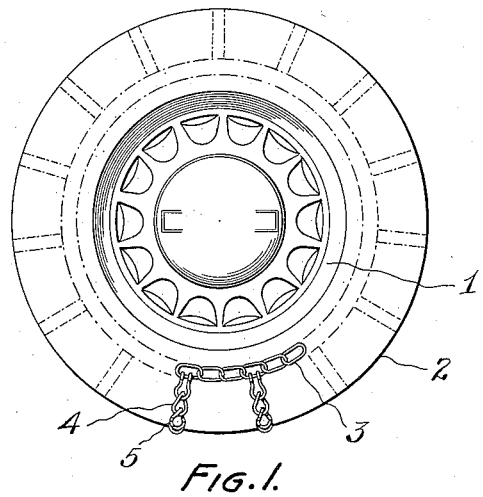
Figure 1 is a side elevation showing an automobile wheel equipped with a chain provided with cross-chains embodying the features of the invention.

In Figure 1 a wheel 1 is shown, carrying a tire 2 upon which an anti-skid chain 3 is applied, said anti-skid chain having cross-chains 4 provided over the tread portion of the tire with specialized links 5 having means to interlockingly engage with the road surface to obtain traction in a longitudinal direction, and also to engage such road surface in a manner to prevent sidewise displacement of the vehicle.

Figure 4:
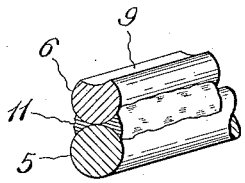
Figure 4 is an enlarged perspective view, partly in section, showing the details of one form of reinforcing lug structure.
Figure 5:
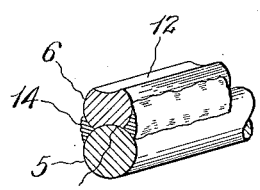
Figure 5 is a view similar to Figure 4, showing a modified form of lug structure.

The preferred form of anti-skid link 5 is provided with a short lug 6, preferably cut along a diagonal line at each end so that when such lug or calk 6 is applied to the inclined side portion of a twisted link, the upper and lower end faces 7, 8, respectively, will be parallel to each other and in substantially a vertical position with reference to the surface traveled over. The lugs 7 are preferably formed of wire stock of the same gage or slightly less gage than the stock of the twisted chain links. The lugs may be formed of full round stock, but are preferably formed with a shallow longitudinal groove 9, as is shown in Figure 4. The lugs are secured to the side portions of the links of the cross-chains by means of welds 11 or similar fastening means, such welds as shown preferably having a large area of contact with both the surface of the link and the surface of the lug or calk united thereto. The welding may be done by automatic machinery, and by reason of the suitable space provided for uniting the parts, high speed production may be attained with a very low factor of rejections.

Where it is desired to have the lug or calk of substantial size and yet have the same extend outwardly from the link to a less extent than the lugs of the type just described, the lug stock is formed with a groove 12 on the outer side conforming to the groove 9 heretofore described, and is also formed with a similar groove 13 on the under side, as is clearly shown in Figure 5 of the drawing. The weld 14 in such case does not cover as great surface area over the link and lug surface adjacent their point of contact, but the groove 13 engaging with the correspondingly rounded surface of the link assists in maintaining a firm bond between the lug and the chain link.

Figure 6:
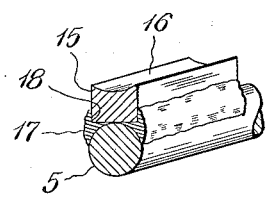
Figure 6 is a view similar to Figures 4 and 5, showing a still further modified form of lug structure.

For certain types of service it may be desired that sharper edges be provided on the reinforcing lugs than would be provided through the use of round stock with a groove formed on the upper side thereof, as heretofore described and as shown in Figures 4 and 5. In such case a structure of the type shown in Figure 6 may be used, wherein the lug stock comprises a substantially rectangular bar 15 having a concave outer surface 16 and having flat side and bottom surfaces. The reinforcing bars of this type are held to the links 5 by means of welds 17 which may be of somewhat larger size than those heretofore shown and which may receive the lower corners 18 of the reinforcing bar within such welds and thus more securely anchor the same against displacement.

Figure 2:
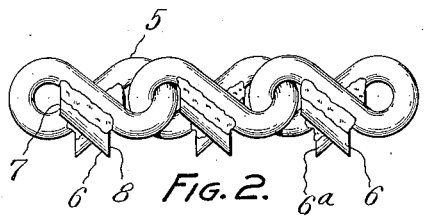
Figure 2 is a side elevation of a section of cross-chain having anti-skid links provided with anti-skid lugs applied thereto embodying the principles of the invention.
Figure 3:
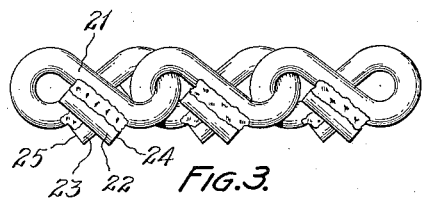
Figure 3 is a view similar to Figure 2, showing the links of a cross-chain provided with lugs of a modified type.

It will be noted that whichever type of cross-section of lug or calk is used, the shallow grooves extending parallel to the side portion of the links of the cross-chains are self-clearing in view of the tendency of any ice, snow, clay or other foreign matter to move transversely on the curved surface and thus become dislodged and also owing to the pressure of the road surface against one end of the material in the shallow groove so that it would tend to move lengthwise thereof under further impacts upon the material within the shallow grooves through contact with the surface traveled over. It will be noted that the grooves are brought down angularly to the surface traveled over and engage such surface as a claw-like cleat, one running angularly in one direction and the other running at a reverse angle to its companion member. Thus, as shown in Figures 2 and 3, the lugs 6 on one side of the chain link extend angularly downward toward the right, and the lugs 6a on the opposite side of the chain link extend angularly downward toward the left. Accordingly, there is a rigid vice-like grip upon the surface traveled over, which not only tends to prevent displacement transversely of the road surface, but also provides an interlock with the surface traveled over, which provides for high tractive effect in the direction of travel of the vehicle.

A number of different forms of lugs may be employed other than those of the particular cross-section described, and they may be made of greater or less extent longitudinally as well as of greater or less size with reference to the cross-chain links to which they are attached. For certain purposes the lugs may be made of small stock and of a length to cause the exposed contact points thereof to be in substantially the plane of the normal contact end portions of the twisted links. It is preferable, however, to have the lugs of a size to project slightly beyond the outermost portions of the link ends so as to provide relatively short sharp corners or somewhat triangular points or end portions so as to form indentations in the surface traveled over and thus interlock with such surface to prevent skidding. Where the lug is shaped as shown in Figure 2, the lower outer portion of the lug has a perpendicular face presenting an acute angle to the body of the lug and this relatively sharp pointed element of the link will be forced by the weight of the vehicle into the icy surface or other slippery surface traveled over to a sufficient extent to cause such chain to be firmly held against slippage on such surface. The shallow groove on the under face of the lug provides a longitudinal clamping device in conjunction with its companion lug on the opposite side of the link, inasmuch as the two shallow grooves engage the surface in opposed relation to each other and thus introduce no tendency to slip toward one side or the other of the road, and afford a firm grip upon the road surface for movement in the direction of travel of the vehicle. The vertical end faces of the lugs projecting beyond the end portions of the links face in opposite directions and thus each opposes lateral movement in the direction in which such end faces are turned.

Figure 7:
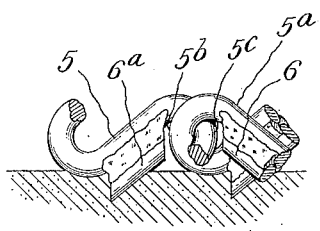
Figure 7 is a fragmentary side elevation, partly in section, showing the relationship of a lug to the end of the adjacent link and the engagement of such lug with the surface.

In addition to the projecting portions of the lugs having a special ground-engaging function as just described, the opposite end portions of the lugs are adapted to be engaged by the extreme ends of the companion links to the links upon which such lugs are secured. Thus, as shown in Figure 7, the lug 6a on the link 5 is adapted to be engaged by the end surface 5b of the companion link 5a, and in turn the end surface 5c of the lug 5 is adapted to abut the end face of the lug 6 on the link 5a. Thus, the chain while freely flexible until it comes in contact with the surface traveled over, when brought into contact with such surface under the weight of the vehicle, causes a movement of the links toward each other as the same are pressed into the surface, and the companion links engage the adjacent end faces of the lugs and cause a certain degree of firmness in the cross-chain tread portion, whereby adjacent links support each other to resist any tendency toward individual displacement. Thus a very high degree of security is brought into the coaction of the several parts of the links under the tread portion of the tire and the danger of skidding is practically negligible.

Figure 8:
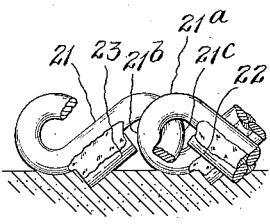
Figure 8 is a view similar to Figure 7, showing a modified type of lug.

In place of forming the end faces of the reinforcing lugs or calks at an angle to the body portion of the lug and parallel to each other, such end faces may each be formed at right angles to the body portion of the lug, as is shown in Figures 3 and 8, or the end face out of contact with the road may be formed at one angle, and the end face adapted to be brought into contact with the road may be formed at another angle. This combination of each type of face on the reinforcing lug is illustrated in Figure 9, and will be described in due course.

Figure 9:
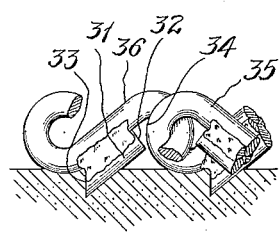
Figure 9 is a view similar to Figures 7 and 8, showing a still further modified type of lug.

The form of construction shown in Figures 3 and 8 is substantially the same in all respects except for the end faces as that heretofore described. It will be noted that the links 21 carry the lugs 22, 23 on the under portions of their respective sides and that the lower end faces 24, 25 of said respective lugs form oppositely directed obtuse angles with the adjacent end portions of the links in contact with the surface. The extreme corner points of the opposing lugs are closer to each other than where such points are prolonged as in the structure shown in Figure 2, but the lugs are preferably formed with grooved outer faces over their body portions and thus have interlocking action with the road surface in substantially the same manner as the lugs shown in Figure 2. The end portion 21b of the link 21 shown in Figure 8, is adapted to bear against the end face of the lug 23 when the parts are in contact with the surface and under pressure of the tire, and the end portion 21c of the link 21a is adapted to bear against the end of the lug 22 when the chain is in engagement with the road surface.

Where it is desired to make the coaction of the end portions of the adjacent links with the end portions of the lugs on an intermediate link more positive, the construction shown in Figure 9 may be utilized wherein the lugs 31 are formed with right angle end faces 32 at their inner ends and with angular faces 33 perpendicular to the ground at the opposite ground-engaging ends. When so constructed, the inner portion 34 of the link 35 adjacent the link 36 carrying the lug will be held within closely spaced relation to the end of the lug during the free movement of the chain and will be brought into contact with the end face of the lug under the weight of the vehicle, and skidding movement in the direction which such lug is positioned to resist will be arrested upon very slight rolling action, as contact of the link 34 with the end of the lug will drive the lug firmly into the surface traveled over and insure non-slipping engagement therewith.

It is not intended to limit the various structures and combinations thereof which may embody the principles of this invention to those shown and described, but merely to illustrate sufficient examples of structures embodying the invention to make clear the principles thereof. It will be understood that the end faces of the lugs will tend to prevent lateral skidding whether or not the links contact with the opposite ends thereof, but such security will be enhanced by the coaction of adjacent links as has been described. Similarly, the omission of grooved surfaces on the outer faces of the reinforcing lugs or calks might not in all cases reduce the traction to a serious extent, but where hard ice is to be traversed, these grooved surfaces on the lugs being inclined toward each other on respective sides of each link provide a grip on the road surface somewhat after the manner of a pipe vise, and thus provide for traction in the direction of travel and security against sidewise slippage as well. As has been stated, the particular shape of the grooves may be varied as well as the various shapes and combinations of end surfaces on the intermediately positioned lug members.

Other modes of applying the principle of my invention may be employed instead of those explained, change being made as regards the structure herein disclosed, provided the means stated by any of the following claims or the equivalent of such stated means be employed.

I therefore particularly point out and distinctly claim as my invention:

1. An anti-skid chain having in combination a plurality of interengaged loop-shaped twisted links, each link being provided centrally of its respective side portions with a reinforcing lug secured in parallel relation on the outer surface of each such side portion and adapted to form an intermediate road surface-engaging element of the link with the central opening of said link free of obstruction, said lugs lying parallel to each other as viewed from above and inclined toward each other as viewed from the side, and the ends of said lugs opposite said surface-engaging portions forming abutments against which adjacent link ends may exert a surface-engaging thrust.

2. An anti-skid cross-chain composed of interconnected links, each link of the tread-portion thereof being twisted so that said links lie in approximately a common plane, and lugs welded to the outer sides of the central portions of the links in parallel relation thereto to form intermediate road surface-engaging elements, said lugs when in contact with the road surface being reversely inclined toward said surface and being beveled at the surface-engaging ends to provide an end face substantially perpendicular to the surface.

3. An anti-skid cross-chain composed of interconnected links, each link of the tread-portion thereof being twisted so that said links lie in approximately a common plane, and lugs welded to the outer sides of the central portions of the links in parallel relation thereto to form intermediate surface-engaging elements, said lugs when in contact with the road surface being reversely inclined toward said surface and being formed at their oppositely-directed outer ends respectively with an angular face adapted to engage the road surface to prevent lateral displacement.

4. An anti-skid cross-chain composed of interconnected links, each link of the tread-portion thereof being twisted so that said links lie in approximately a common plane, and lugs welded to the outer sides of the central portions of the links in parallel relation thereto to form intermediate surface-engaging elements, said lugs when in contact with the road surface being reversely inclined toward said surface, the inner ends of said lugs each presenting an abutting surface to be engaged by the adjacent link, and being beveled at the surface-engaging ends to provide an end face substantially perpendicular to said surface.

5. An anti-skid cross-chain composed of interconnected links, each link of the tread-portion thereof being twisted so that said links lie in approximately a common plane, and lugs welded to the outer sides of the central portions of the links in parallel relation thereto to form intermediate surface-engaging elements, shallow grooves formed longitudinally of the outer road-engaging surface of each of said lugs, said lugs when in contact with the road surface being reversely inclined toward said surface and each lug being beveled at its surface-engaging end to provide an end face substantially perpendicular to said surface.

6. An anti-skid cross-chain composed of interconnected links, each link twisted so that said links lie in approximately a common plane, and lugs welded to the outer side portions of the links at the tread portion of said cross-chain and lying parallel thereto to provide intermediate ground-engaging surfaces for said links, said lugs being grooved on their outer surfaces longitudinally, and the companion lugs on each link forming reversely disposed surface-engaging cleats, the grooves providing pairs of parallel ribs for traction in the direction of travel and the end portions of said companion lugs providing surfaces to prevent transverse skidding movement in either lateral direction.

LOUIS D. CULL.